(12) United States Patent
Inoue et al.

(10) Patent No.: US 11,215,907 B2
(45) Date of Patent: Jan. 4, 2022

(54) OPTICAL UNIT AND PROJECTION APPARATUS

(71) Applicant: FUJIFILM Corporation, Tokyo (JP)

(72) Inventors: Kazuki Inoue, Saitama (JP); Chikara Yamamoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/998,563

(22) Filed: Aug. 20, 2020

(65) Prior Publication Data
US 2020/0379324 A1  Dec. 3, 2020

Related U.S. Application Data

(63) Continuation of application No. PCT/JP2019/006391, filed on Feb. 20, 2019.

(30) Foreign Application Priority Data

Feb. 21, 2018  (JP) .............................. JP2018-029057

(51) Int. Cl.
G03B 21/14   (2006.01)
G02B 7/04    (2021.01)
(Continued)

(52) U.S. Cl.
CPC ............. G03B 21/142 (2013.01); G02B 7/04 (2013.01); G03B 17/54 (2013.01); G03B 21/145 (2013.01); G03B 9/02 (2013.01); G03B 21/2033 (2013.01)

(58) Field of Classification Search
CPC .... G03B 21/14; G03B 21/142; G03B 21/005; G03B 21/006; G03B 21/008; G03B 21/145; G02B 17/54; G02B 7/04
See application file for complete search history.

(56) References Cited

U.S. PATENT DOCUMENTS 4,527,872 A    7/1985  Gentleman et al.
5,442,484 A    8/1995  Shikawa
(Continued)

FOREIGN PATENT DOCUMENTS

JP    6-138386 A    5/1994
JP    9-98442 A     4/1997
(Continued)

OTHER PUBLICATIONS

International Preliminary Report on Patentability, search dated Aug. 29, 2019, for International Application No. PCT/JP2019/006391, with an English translation.

(Continued)

Primary Examiner — William C. Dowling
(74) Attorney, Agent, or Firm — Birch, Stewart, Kolasch & Birch, LLP

(57) ABSTRACT

An optical unit includes: a projection optical system on which light from a display unit is incident; a common optical system that projects light passing through the projection optical system to a projection target object and forms an image of a subject at a side of the projection target object; an optical member for guiding light passing through the projection optical system to the common optical system and guiding an intermediate image formed by at least a part of the common optical system to an imaging element; and an imaging optical system for forming the intermediate image on the imaging element, and an image forming position of the intermediate image is present between a component closest to a side of the projection target object among components constituting the common optical system and the optical member.

17 Claims, 8 Drawing Sheets

(51) Int. Cl.
*G03B 17/54* (2021.01)
*G03B 9/02* (2021.01)
*G03B 21/20* (2006.01)

(56) References Cited

U.S. PATENT DOCUMENTS

| | | | |
|---|---|---|---|
| 5,671,993 | A | 9/1997 | Shikama |
| 2005/0162409 | A1* | 7/2005 | Hendriks ............ G06F 3/03542 |
| | | | 345/173 |
| 2007/0120983 | A1 | 5/2007 | Yamamoto et al. |
| 2007/0160362 | A1* | 7/2007 | Mitsuo .................. G03B 13/06 |
| | | | 396/373 |
| 2007/0263174 | A1* | 11/2007 | Shyu ..................... G06F 3/0304 |
| | | | 353/34 |
| 2008/0051135 | A1* | 2/2008 | Destain ................ H04N 9/3176 |
| | | | 455/556.1 |
| 2012/0200832 | A1 | 8/2012 | Imai |
| 2018/0284462 | A1* | 10/2018 | Kano ....................... H04N 1/19 |
| 2018/0356612 | A1* | 12/2018 | Oota .................... G03B 21/008 |
| 2020/0033702 | A1* | 1/2020 | Inoue ................... H04N 9/3194 |
| 2020/0033712 | A1* | 1/2020 | Inoue ..................... G02B 5/005 |
| 2020/0278594 | A1* | 9/2020 | Inoue ..................... G03B 17/54 |

FOREIGN PATENT DOCUMENTS

| | | |
|---|---|---|
| JP | 2001-116990 A | 4/2001 |
| JP | 2004-271891 A | 9/2004 |
| JP | 2007-183503 A | 7/2007 |
| JP | 2008-257125 A | 10/2008 |
| JP | 2016-149618 A | 8/2016 |
| JP | 2017-68089 A | 4/2017 |
| JP | 2017-68090 A | 4/2017 |
| WO | WO 2005/083507 A1 | 9/2005 |
| WO | WO 2011/046035 A1 | 4/2011 |

OTHER PUBLICATIONS

International Search Report and Written Opinion of the International Searching Authority, dated May 21, 2019, for International Application No. PCT/JP2019/006391, with an English translation of the International Search Report.
Japanese Office Action, dated Mar. 9, 2021, for Japanese Application No. 2020-501006, with an English machine translation.
Japanese Notice of Reasons for Refusal for Japanese Application No. 2020-501006, dated Jun. 8, 2021, with an English translation.

* cited by examiner

OPTICAL UNIT AND PROJECTION APPARATUS

CROSS REFERENCE TO RELATED APPLICATION

This is a continuation of International Application No. PCT/JP2019/006391 filed on Feb. 20, 2019, and claims priority from Japanese Patent Application No. 2018-029057 filed on Feb. 21, 2018, the entire disclosures of which are incorporated herein by reference.

BACKGROUND OF THE INVENTION

1. Field of the Invention

The present invention relates to an optical unit and a projection apparatus.

2. Description of the Related Art

Projection apparatuses having an imaging function have been suggested as disclosed in JP2016-149618A, JP2008-257125A, WO2011/046035A, and WO2005/083507A.

JP2016-149618A discloses a projector including a half mirror that transmits light from a projection unit to a screen and guides light from the screen to an imaging unit, a lens that is arranged between the half mirror and the projection unit, and a lens that is arranged between the half mirror and the imaging unit.

JP2008-257125A discloses an apparatus including a projection unit, an imaging unit, a half mirror that projects light from the projection unit to a screen and guides light from the screen to the imaging unit, a lens that is arranged between the half mirror and the projection unit, a lens that is arranged on a screen side from the half mirror, and a lens that is arranged between the half mirror and the imaging unit.

WO2011/046035A discloses an apparatus including a laser light source for scanning, a half mirror that transmits light from the laser light source to a screen side, a projection and imaging lens on which light transmitted through the half mirror, an imaging lens on which light that is condensed by the projection and imaging lens and reflected by the half mirror is incident, and an imaging element that receives light passing through the imaging lens.

WO2005/083507A discloses an apparatus including a display element, a half mirror that transmits light from the display element to a screen side, a projection and imaging lens on which light transmitted through the half mirror is incident, and an imaging element on which light that is condensed by the projection and imaging lens and reflected by the half mirror is incident.

SUMMARY OF THE INVENTION

In order to improve projection performance and imaging performance in an apparatus having an imaging function and a projection function, it is effective to configure that an optical system such as a lens is arranged between a branch member such as the half mirror and the imaging unit and the projection unit as disclosed in JP2016-149618A, and an optical system is further arranged on the screen side from the branch member as disclosed in JP2008-257125A, WO2011/046035A, and WO2005/083507A.

In the apparatus having such a configuration, the number of optical systems is increased. Thus, an object is to reduce design cost and reduce the size of the apparatus. In JP2016-149618A, JP2008-257125A, WO2011/046035A, and WO2005/083507A, the above configuration is not disclosed, and such an object is not mentioned.

The present invention is conceived in view of the above matter, and an object thereof is to provide an optical unit enabling reduction of design cost and size reduction and a projection apparatus comprising the optical unit.

An optical unit of the present invention comprises a projection optical system on which light from a display unit is incident, a common optical system that projects light passing through the projection optical system to a projection target object and forms an image of subject light at a side of the projection target object, an optical member for guiding light passing through the projection optical system to the common optical system and guiding an intermediate image formed by at least a part of the common optical system to an imaging element, and an imaging optical system for forming the intermediate image on the imaging element, in which an image forming position of the intermediate image is present between a component closest to a side of the projection target object among components constituting the common optical system and the optical member.

A projection apparatus of the present invention comprises the optical unit and the display unit.

According to the present invention, an optical unit enabling reduction of design cost and size reduction and a projection apparatus comprising the optical unit can be provided.

DESCRIPTION OF THE PREFERRED EMBODIMENTS

Figure 1:
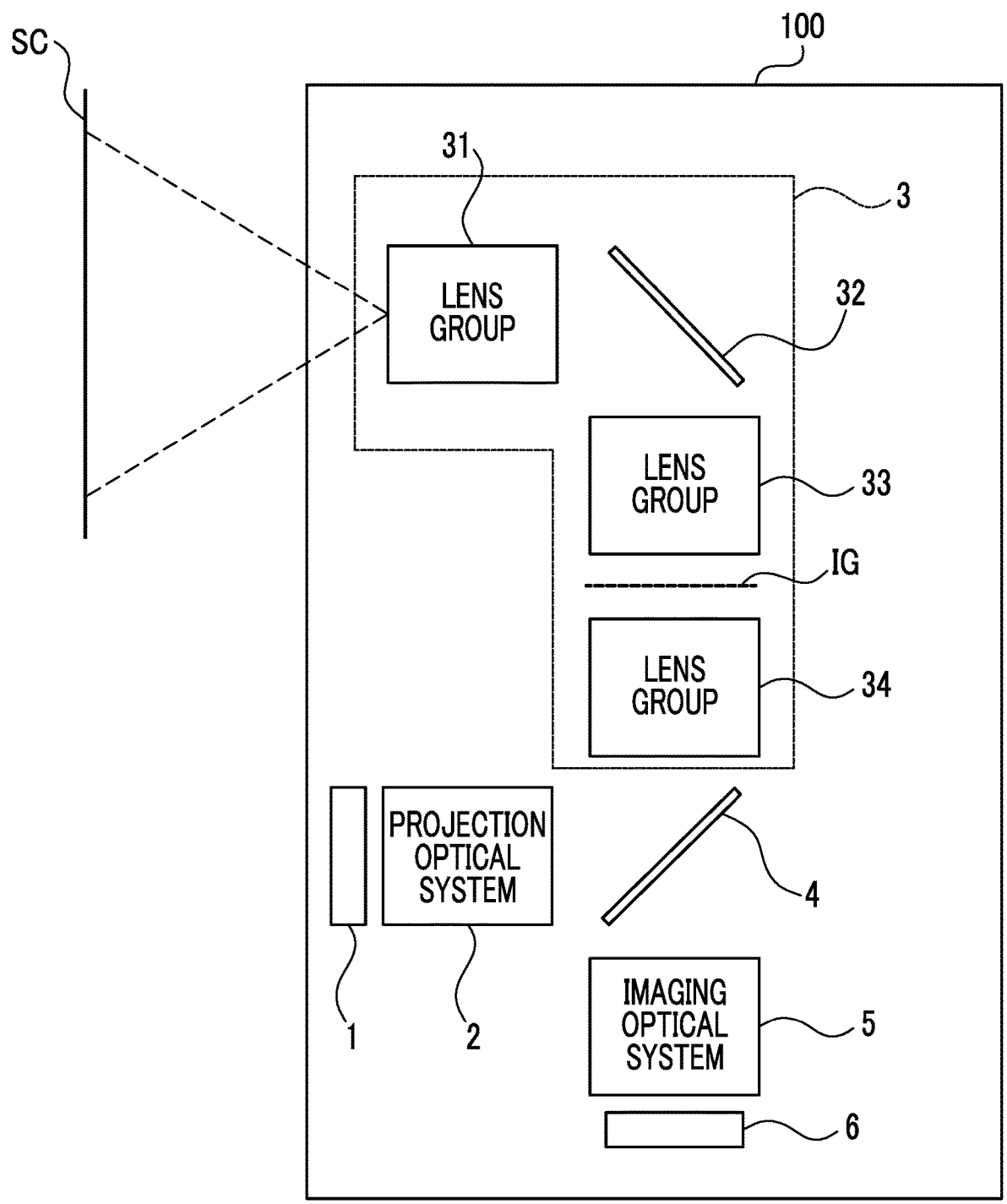
FIG. 1 is a schematic diagram illustrating a schematic configuration of a projector 100 that is a projection apparatus according to one embodiment of the present invention.
Figure 2:
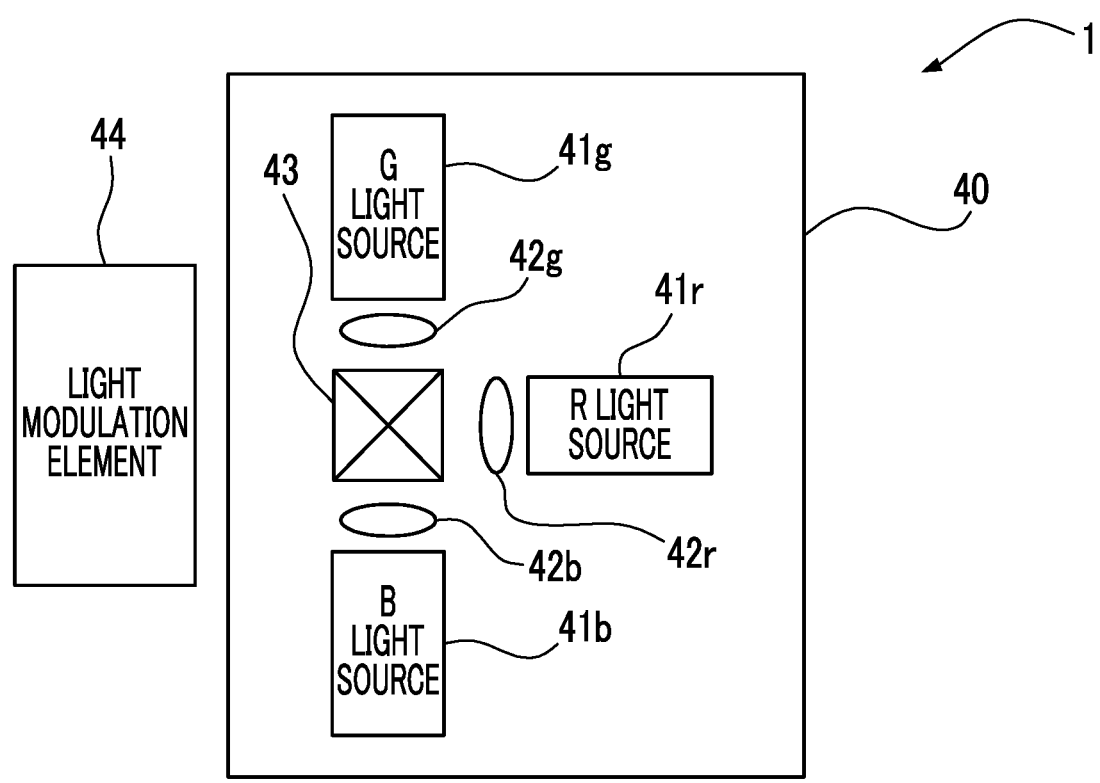
FIG. 2 is a schematic diagram illustrating a configuration example of a display unit 1 of the projector 100 illustrated in FIG. 1.

FIG. 1 is a schematic diagram illustrating a schematic configuration of a projector 100 that is a projection apparatus according to one embodiment of the present invention. FIG. 2 is a schematic diagram illustrating a configuration example of a display unit 1 of the projector 100 illustrated in FIG. 1.

The projector 100 is configured to be capable of projecting an image to a screen SC and imaging a range including a projection image projected on the screen SC.

The projector 100 comprises the display unit 1, a projection optical system 2, a common optical system 3, an optical member 4, an imaging optical system 5, and an imaging element 6.

The display unit 1 displays an image for projection based on input image data. As illustrated in FIG. 2, the display unit 1 comprises a light source unit 40 and a light modulation element 44.

The light source unit 40 comprises an R light source 41r that is a red light source emitting red light, a G light source 41g that is a green light source emitting green light, a B light source 41b that is a blue light source emitting blue light, a dichroic prism 43, a collimator lens 42r that is disposed between the R light source 41r and the dichroic prism 43, a collimator lens 42g that is disposed between the G light source 41g and the dichroic prism 43, and a collimator lens 42b that is disposed between the B light source 41b and the dichroic prism 43.

The dichroic prism 43 is an optical member for guiding the light emitted from each of the R light source 41r, the G light source 41g, and the B light source 41b on the same optical path. That is, the dichroic prism 43 emits red light collimated by the collimator lens 42r to the light modulation element 44 by transmitting the red light. In addition, the dichroic prism 43 emits green light collimated by the collimator lens 42g to the light modulation element 44 by reflecting the green light. Furthermore, the dichroic prism 43 emits blue light collimated by the collimator lens 42b to the light modulation element 44 by reflecting the blue light. The optical member having such a function is not limited to the dichroic prism. For example, a cross dichroic mirror may be used.

Each of the R light source 41r, the G light source 41g, and the B light source 41b uses a light emitting element such as a laser or a light emitting diode (LED). The number of light sources included in the light source unit 40 may be one, two, or four or more.

The light modulation element 44 spatially modulates the light emitted from the dichroic prism 43 based on the image data and emits spatially modulated image light (red image light, blue image light, and green image light) to the projection optical system 2 in FIG. 1.

While FIG. 2 is an example of using a digital micromirror device (DMD) as the light modulation element 44, for example, liquid crystal on silicon (LCOS), a micro electro mechanical systems (MEMS) element, or a liquid crystal display device can also be used as the light modulation element 44.

The display unit 1 may display an image using a spontaneous light emission type organic electro-luminescence (EL) display element and cause the displayed image to be incident on the projection optical system 2. Alternatively, a display unit that displays the image by scanning laser light may be used.

The projection optical system 2 is an optical system on which image light from the display unit 1 is incident, and is configured with a relay optical system including at least one lens. Light passing through the projection optical system 2 is incident on the optical member 4, reflected by the optical member 4, and incident on the common optical system 3.

The common optical system 3 is an optical system that projects the light passing through the projection optical system 2 to the screen SC which is a projection target object, and forms an image of a subject on the screen SC side. The common optical system 3 is configured with a relay optical system.

In the example in FIG. 1, the common optical system 3 comprises a lens group 31 including at least one lens, an optical member 32, a lens group 33 including at least one lens, and a lens group 34 including at least one lens. The lens group 31, the optical member 32, the lens group 33, and the lens group 34 are arranged on the optical path in this order from the screen SC side.

The optical member 32 is a member for bending the optical path of the common optical system 3 and uses, for example, a half mirror, a beam splitter, or a polarization member. The optical member 32 constitutes a first bending optical member.

The image light passing through the projection optical system 2 is reflected by the optical member 4 and incident on the lens group 34. By the lens group 34, an intermediate image formed by the image light is formed at a position IG between the lens group 33 and the lens group 34.

The intermediate image passes through the lens group 33 and is incident on the optical member 32, reflected by the optical member 32, and incident on the lens group 31. The intermediate image incident on the lens group 31 is projected toward the screen SC.

Meanwhile, subject light incident on the lens group 31 from the screen SC side passes through the lens group 31 and is reflected by the optical member 32 and incident on the lens group 33. By the lens group 33, an intermediate image formed by the subject light is formed at the position IG between the lens group 33 and the lens group 34.

The intermediate image passes through the lens group 34 and is incident on the optical member 4, transmitted through the optical member 4, and incident on the imaging optical system 5.

The imaging element 6 uses a charge coupled device (CCD) image sensor, a complementary metal oxide semiconductor (CMOS) image sensor, or the like.

The imaging optical system 5 is an optical system for causing the intermediate image formed at the position IG to be formed on the imaging element 6. The imaging optical system 5 is arranged in front of the imaging element 6 and condenses the subject light transmitted through the optical member 4 and forms an image of the subject light on the imaging element 6. The imaging optical system 5 is configured to include at least one lens.

The optical member 4 is configured with, for example, a half mirror, a beam splitter, or a polarization member. The optical member 4 guides the image light passing through the projection optical system 2 to the common optical system 3 by reflecting the image light and guides the intermediate image based on the subject light formed at the position IG by the lens group 33 of the common optical system 3 to the imaging element 6 through the imaging optical system 5.

The projection optical system 2, the common optical system 3, the optical member 4, the imaging optical system 5, and the imaging element 6 illustrated in FIG. 1 constitute an optical unit.

According to the projector 100 configured as above, the image for projection displayed by the display unit 1 can be projected to the screen SC, and the projection image of this image can be captured by the imaging element 6.

In the projector 100, the intermediate image based on the subject light is formed at the position IG between the lens group 33 and the lens group 34 inside the common optical system 3. Thus, for example, the distance between the intermediate image and the imaging optical system 5 can be sufficiently increased compared to the distance in a case where the intermediate image is present on the imaging optical system 5 side from the optical member 4. Consequently, an increase in size of the imaging optical system 5 can be prevented, and size reduction of the optical unit and reduction of a design load of the imaging optical system 5 can be achieved.

In addition, according to the projector 100, each of the common optical system 3 and the projection optical system 2 is configured with a relay optical system. Thus, a back focus in a system into which the common optical system 3 and the projection optical system 2 are combined can be shortened. In addition, since a ray is approximated to collimated light, the sizes of the optical member 4 and the optical member 32 can be reduced.

In addition, according to the projector 100, the image forming position of the intermediate image based on the image light matches the image forming position of the intermediate image based on the subject light. Thus, optical system design is facilitated, and design cost can be reduced.

In addition, according to the projector 100, the optical path of the common optical system 3 is bent by the optical member 32. Thus, a degree of freedom in the shape of the projector 100 can be provided.

In a case where the position IG at which the intermediate image is formed is present between the lens closest to the screen SC side among the lenses included in the common optical system 3 and the optical member 4, the distance between the intermediate image based on the subject light and the imaging optical system 5 can be sufficiently increased.

Figure 3:
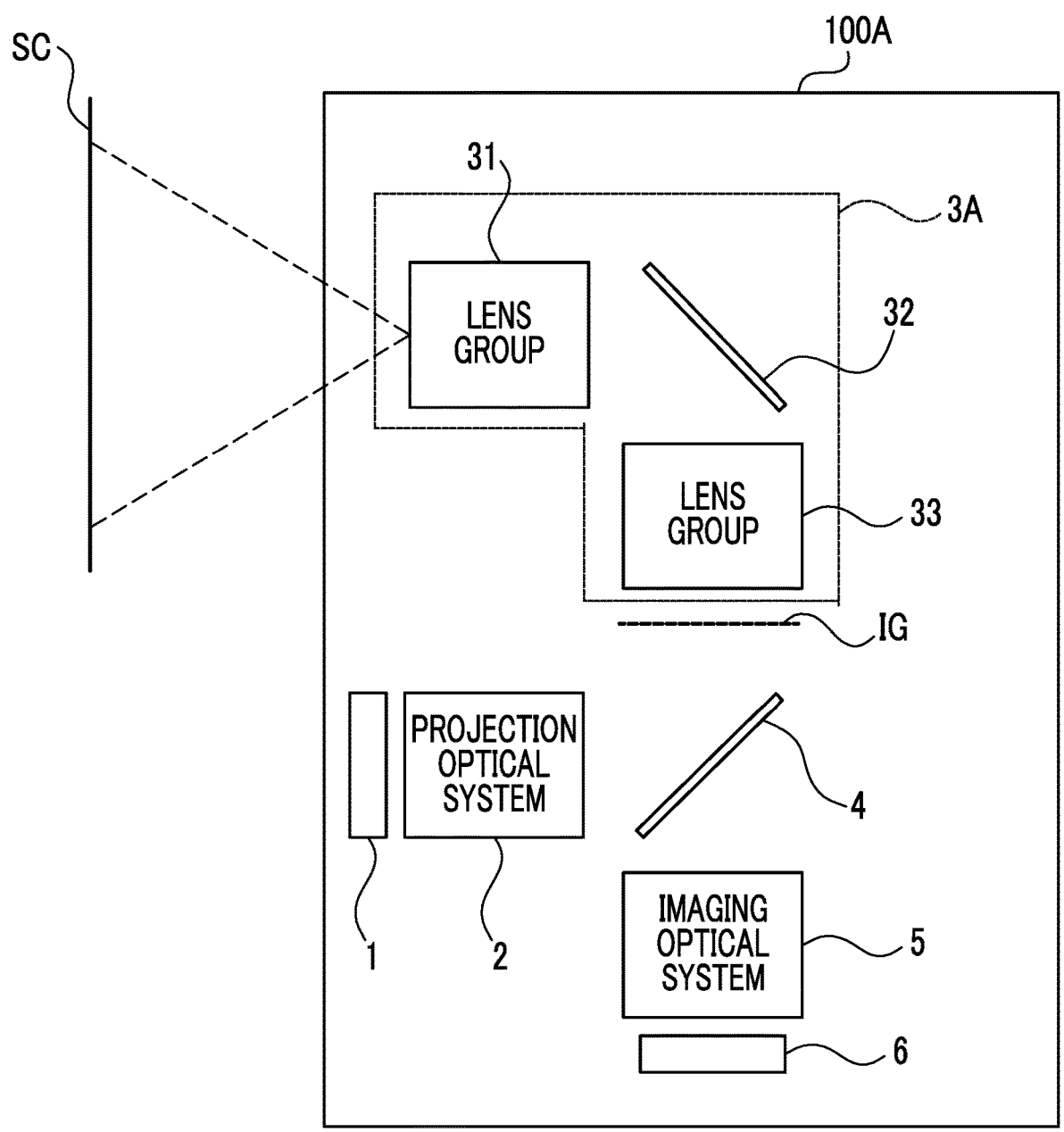
FIG. 3 is a schematic diagram illustrating a schematic configuration of a projector 100A that is a modification example of the projector 100 illustrated in FIG. 1.

FIG. 3 is a schematic diagram illustrating a schematic configuration of a projector 100A that is a modification example of the projector 100 illustrated in FIG. 1. The projector 100A has the same configuration as the projector 100 except that the common optical system 3 is changed to a common optical system 3A. In FIG. 3, the same configurations as in FIG. 1 will be designated by the same reference signs, and descriptions of such configurations will not be repeated.

The common optical system 3A of the projector 100A is obtained by removing the lens group 34 from the common optical system 3 in FIG. 1. By the common optical system 3A, the intermediate image based on the subject light is formed at the position IG between the lens group 33 and the optical member 4. According to the projector 100A, further size reduction from the projector 100 can be achieved.

Figure 4:
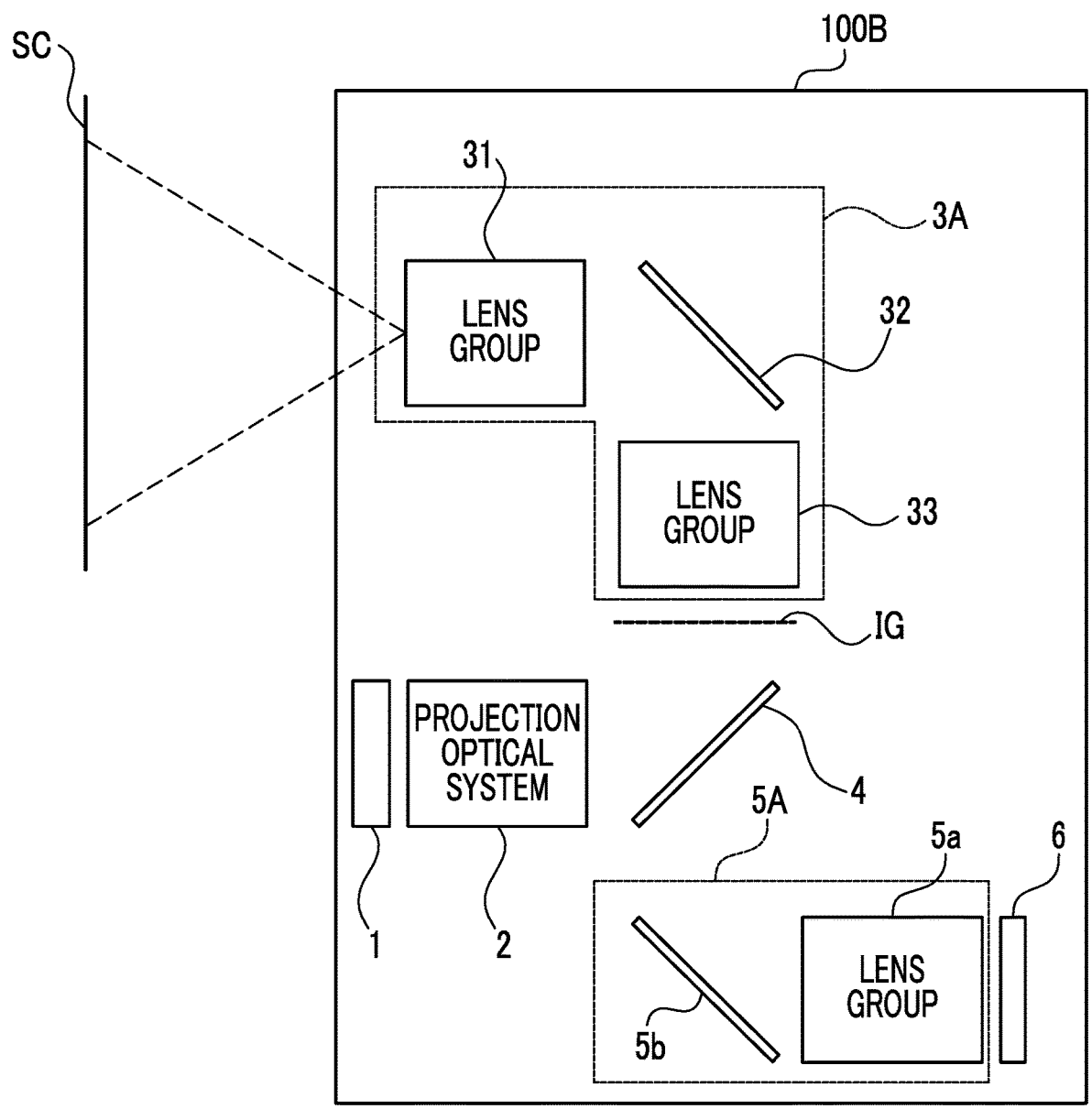
FIG. 4 is a schematic diagram illustrating a schematic configuration of a projector 100B that is a modification example of the projector 100 illustrated in FIG. 1.

FIG. 4 is a schematic diagram illustrating a schematic configuration of a projector 100B that is a modification example of the projector 100 illustrated in FIG. 1. The projector 100B has the same configuration as the projector 100A in FIG. 3 except that the imaging optical system 5 is changed to an imaging optical system 5A and the position of the imaging element 6 is changed. In FIG. 4, the same configurations as in FIG. 3 will be designated by the same reference signs, and descriptions of such configurations will not be repeated.

The imaging optical system 5A of the projector 100B comprises a lens group 5a consisting of at least one lens and an optical member 5b constituting a second bending optical member.

The optical member 5b is a member for guiding the subject light transmitted through the optical member 4 to the lens group 5a by reflecting the subject light and is configured with, for example, a half mirror, a beam splitter, or a polarization member.

The lens group 5a forms the intermediate image on the imaging element 6 by condensing the subject light reflected by the optical member 5b.

According to the projector 100B, the optical path of the imaging optical system 5A is bent by the optical member 5b. Thus, interference between various parts or the like constituting a main body of the projector 100B and the imaging optical system 5A and the imaging element 6 can be prevented. Consequently, a degree of freedom in design of the projector 100B can be provided.

Figure 5:
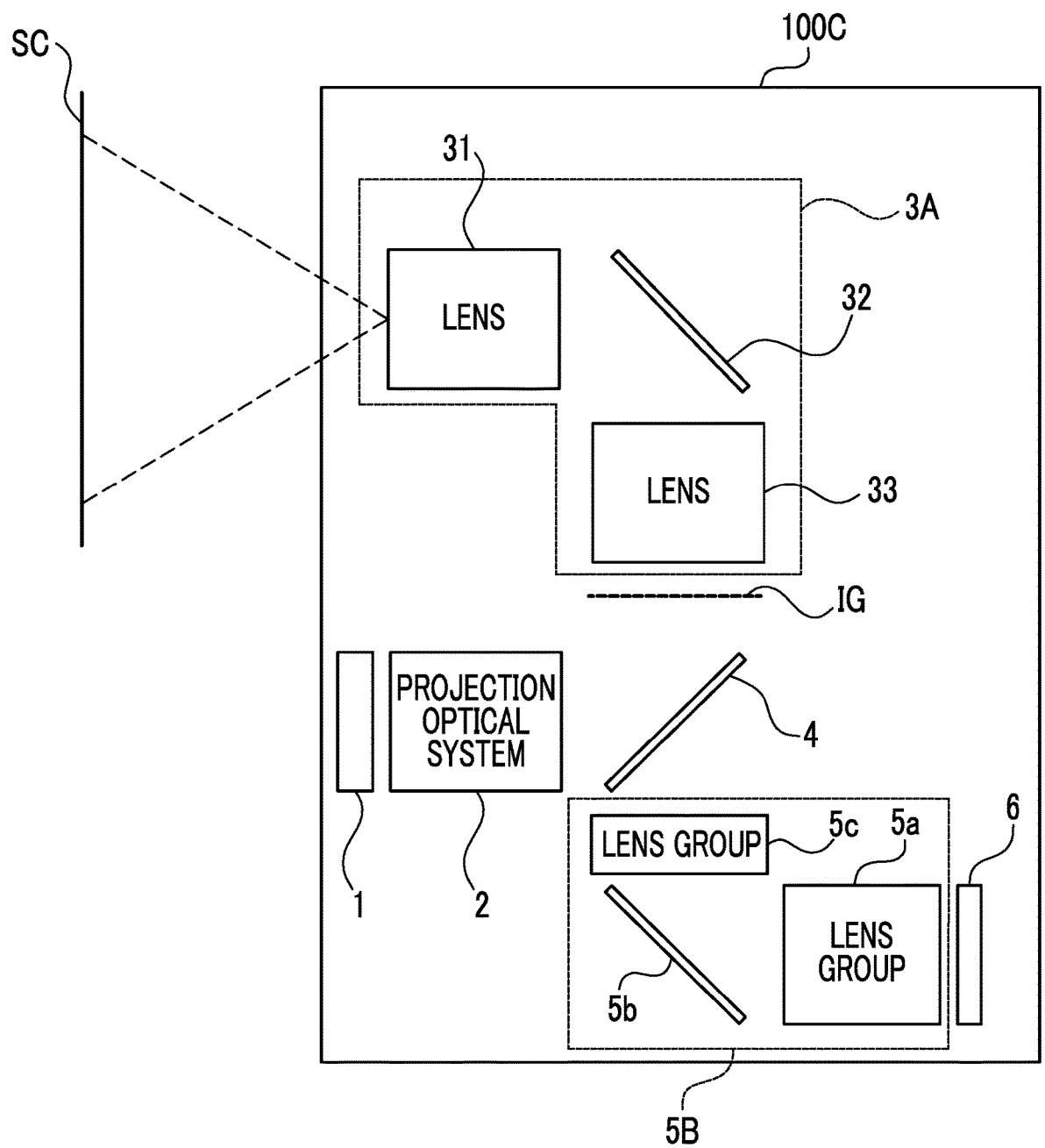
FIG. 5 is a schematic diagram illustrating a schematic configuration of a projector 100C that is a modification example of the projector 100 illustrated in FIG. 1.

FIG. 5 is a schematic diagram illustrating a schematic configuration of a projector 100C that is a modification example of the projector 100 illustrated in FIG. 1. The projector 100C has the same configuration as the projector 100A in FIG. 4 except that the imaging optical system 5A is changed to an imaging optical system 5B. In FIG. 5, the same configurations as in FIG. 4 will be designated by the same reference signs, and descriptions of such configurations will not be repeated.

The imaging optical system 5B of the projector 100C is obtained by adding a lens group 5c consisting of at least one lens to the configuration of the imaging optical system 5A in FIG. 4.

The lens group 5c is arranged between the optical member 5b and the optical member 4 and causes the subject light transmitted through the optical member 4 to be incident on the optical member 5b.

According to the projector 100C having the above configuration, by adding the lens group 5c, a range of design of the imaging performance can be provided, and high performance imaging can be achieved.

Figure 6:
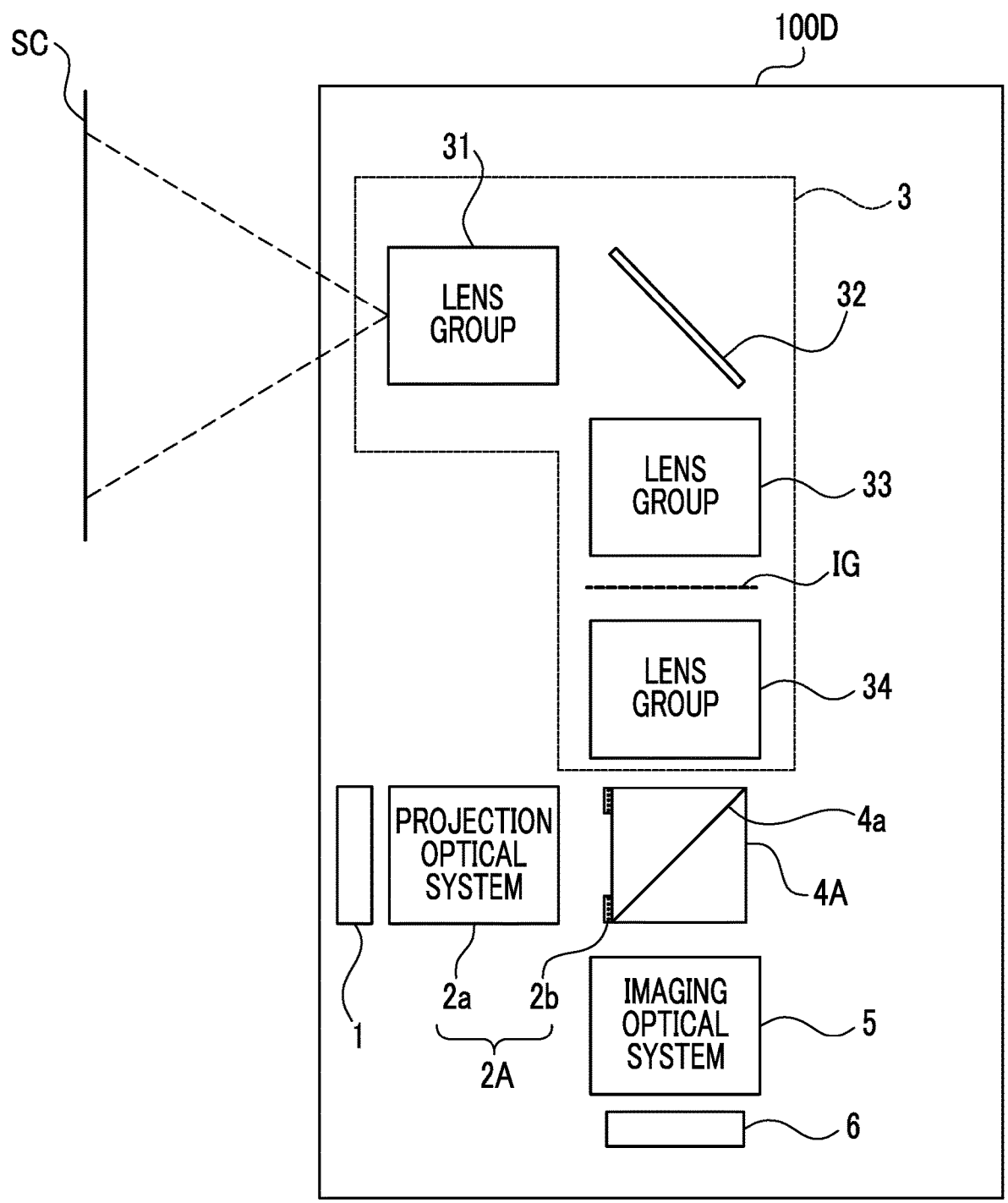
FIG. 6 is a schematic diagram illustrating a schematic configuration of a projector 100D that is a modification example of the projector 100 illustrated in FIG. 1.

FIG. 6 is a schematic diagram illustrating a schematic configuration of a projector 100D that is a modification example of the projector 100 illustrated in FIG. 1. The projector 100D has the same configuration as the projector 100 in FIG. 1 except that the optical member 4 is changed to an optical member 4A and the projection optical system 2 is changed to a projection optical system 2A. In FIG. 6, the same configurations as in FIG. 1 will be designated by the same reference signs, and descriptions of such configurations will not be repeated.

The optical member 4A of the projector 100D has the same function as the optical member 4 and specifically, is configured with a beam splitter having a functional surface 4a reflecting the image light and transmitting the subject light inside the beam splitter.

The projection optical system 2A of the projector 100D comprises a projection lens group 2a that is configured with a relay optical system consisting of at least one lens, and a stop (diaphragm) 2b that is arranged between the projection lens group 2a and the optical member 4A.

The stop 2b is configured with a frame-shaped light blocking member that is fixed to a periphery portion of a surface of the optical member 4A facing the projection lens group 2a.

According to the projector 100D having such a configuration, the area of luminous flux of the image light is decreased by the stop 2b. Thus, the size of the optical member 4A can be reduced. In addition, since the stop 2b is not present on a path on which the subject light passes, a decrease in imaging performance can be prevented without affecting the brightness of the captured image.

Figure 7:
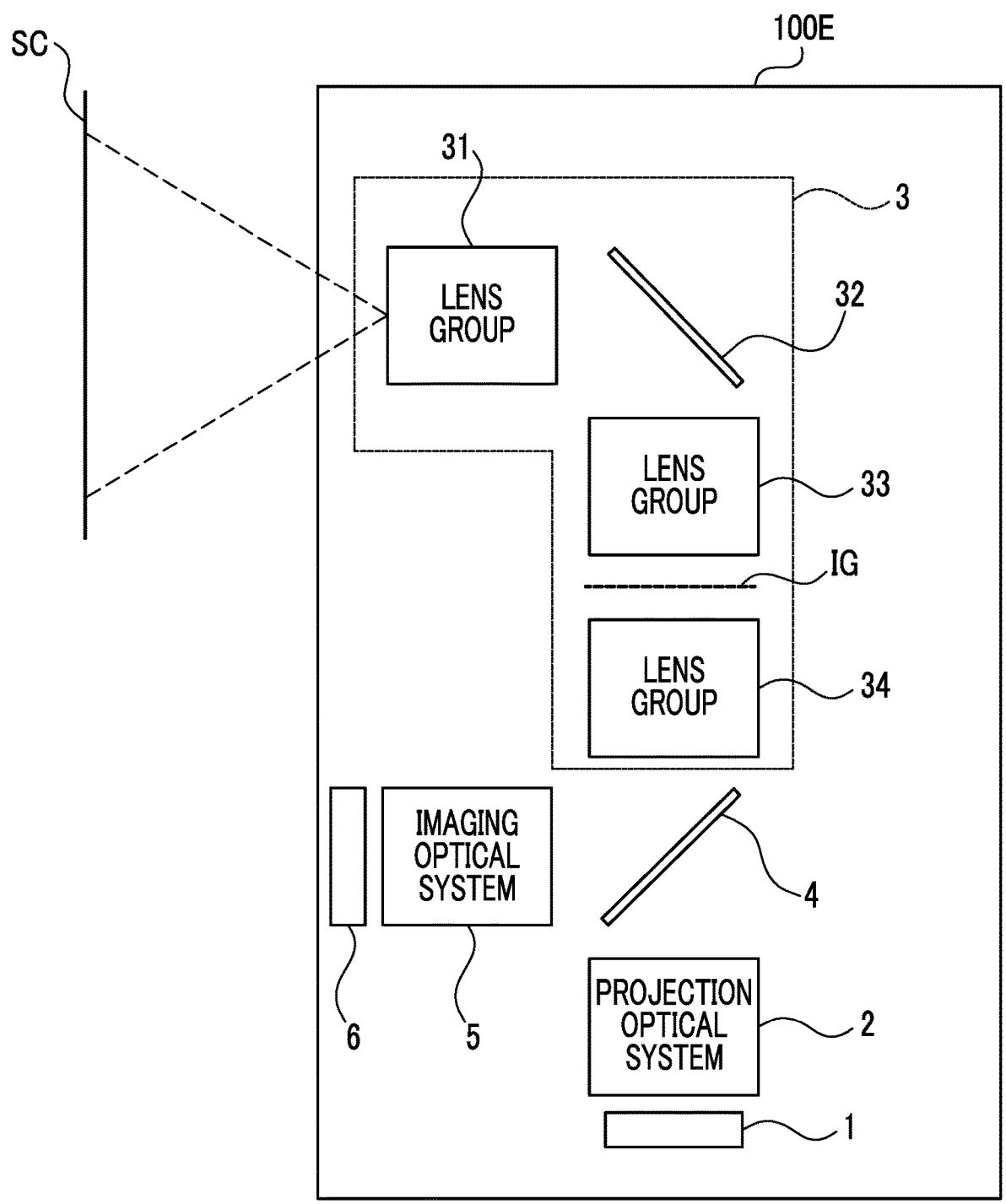
FIG. 7 is a schematic diagram illustrating a schematic configuration of a projector 100E that is a modification example of the projector 100 illustrated in FIG. 1.

FIG. 7 is a schematic diagram illustrating a schematic configuration of a projector 100E that is a modification example of the projector 100 illustrated in FIG. 1. The projector 100E has the same configuration as the projector 100 except that the positions of the imaging optical system 5 and the imaging element 6 and the positions of the projection optical system 2 and the display unit 1 are reversed. In FIG. 7, the same configurations as in FIG. 1 will be designated by the same reference signs, and descriptions of such configurations will not be repeated.

The optical member 4 of the projector 100E guides the subject light passing through the lens group 34 to the imaging optical system 5 by reflecting the subject light and guides the image light incident from the projection optical system 2 to the lens group 34 by transmitting the image light. According to the projector 100E, the same effect as the projector 100 can be achieved.

Figure 8:
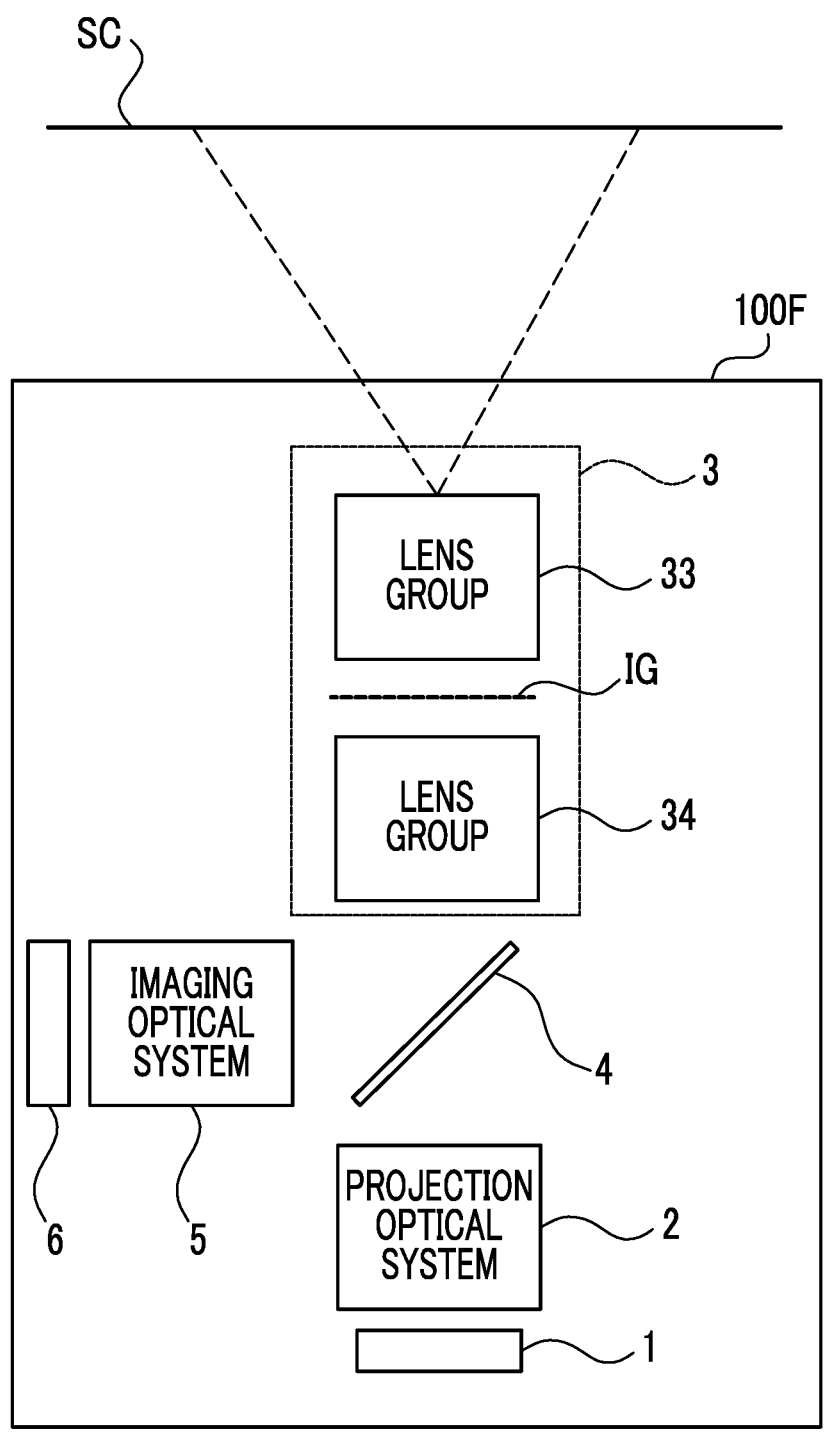
FIG. 8 is a schematic diagram illustrating a schematic configuration of a projector 100F that is a modification example of the projector 100 illustrated in FIG. 1.

FIG. 8 is a schematic diagram illustrating a schematic configuration of a projector 100F that is a modification example of the projector 100 illustrated in FIG. 1. The projector 100F has the same configuration as the projector 100E in FIG. 7 except that the optical member 32 and the lens group 31 are removed. According to the projector 100F in FIG. 8, further size reduction from the projector 100E can be achieved.

In the projector 100 and the projectors 100A to 100F described so far, the imaging optical system 5 (5A and 5B) may include a movable component for changing an imaging condition. At least one of a movable stop (movable diaphragm) of which the amount of opening is variable, a focus lens that changes a focal position by moving in an optical axis direction, or a zoom lens that changes a focal length by moving in the optical axis direction can be used as the movable component. A deformable liquid lens may be used as the focus lens.

By including the movable stop, the focus lens, the zoom lens, or the like in the imaging optical system 5 (5A and 5B), the imaging performance can be improved.

In addition, in the projector 100 and the projectors 100A to 100F, the optical unit configured with the projection optical system 2 (2A), the common optical system 3 (3A), the optical member 4 (4A), the imaging optical system 5 (5A and 5B), and the imaging element 6 may be configured to be attachable and detachable to and from a projector main body incorporating the display unit 1.

According to this configuration, an imaging function can be retrofitted into a projector not having the imaging function, and convenience can be improved.

Alternatively, in the projector 100 and the projectors 100A to 100F, the imaging element 6 may be configured to be attachable and detachable.

According to this configuration, for example, by attaching a main body of a commercially available interchangeable lens type digital camera to the projector main body, the imaging function can be added to the projector, and convenience can be improved.

In addition, in the projector 100 and the projectors 100A to 100C, it is preferable that the optical member 4 uses a half mirror that transmits and reflects light by a metal film. According to this configuration, the image light can be reflected without an effect of the polarization characteristics of the display unit 1.

In addition, in the projector 100 and the projectors 100A to 100F, it is preferable that an imaging magnification of the imaging optical system 5 (5A and 5B) for the intermediate image incident on the optical member 4 (4A) is greater than or equal to 0.1 and less than 1.0 times a projection magnification of the projection optical system 2 (2A) for the image displayed by the display unit 1. By setting such a relationship, the sizes of the imaging optical system 5 and the imaging element 6 can be further reduced.

In addition, by setting such a relationship, size reduction of the apparatus can be achieved even in a case where, for example, any of full size (36 mm×24 mm), Advanced Photo System (APS)-C size (23.6 mm×15.6 mm), ⅓ type (4.8 mm×3.6 mm), or ¼ type (3.6 mm×2 mm) is used as the imaging element 6 and a display unit having display resolution supporting 4K, Wide Ultra eXtended Graphics Array (WUXGA), Super Video Graphics Array (SVGA), or Video Graphics Array (VGA) is used as the display unit 1.

As described above, the following is disclosed in the present specification.

(1) An optical unit comprising a projection optical system on which light from a display unit is incident, a common optical system that projects light passing through the projection optical system to a projection target object and forms an image of subject light at a side of the projection target object, an optical member for guiding light passing through the projection optical system to the common optical system and guiding an intermediate image formed by at least a part of the common optical system to an imaging element, and an imaging optical system for forming the intermediate image on the imaging element, in which an image forming position of the intermediate image is present between a component closest to a side of the projection target object among components constituting the common optical system and the optical member.

(2) The optical unit according to (1), in which the image forming position is present between the optical member and the common optical system.

(3) The optical unit according to (1) or (2), in which an imaging magnification of the imaging optical system for the intermediate image incident on the optical member is greater than or equal to 0.1 and less than 1.0 times a projection magnification of the projection optical system for an image displayed by the display unit.

(4) The optical unit according to any one of (1) to (3), in which the common optical system includes a first bending optical member for bending an optical path.

(5) The optical unit according to any one of (1) to (4), in which the imaging optical system includes a second bending optical member for bending an optical path.

(6) The optical unit according to any one of (1) to (5), in which the imaging optical system includes a movable component for changing an imaging condition.

(7) The optical unit according to (6), in which the movable component is at least one of a movable stop, a focus lens, or a zoom lens.

(8) The optical unit according to any one of (1) to (7), in which the projection optical system comprises at least one lens and a stop arranged between the lens and the optical member, and the stop is fixed to the optical member.

(9) The optical unit according to any one of (1) to (8), further comprising the imaging element.

(10) A projection apparatus comprising the optical unit according to any one of (1) to (9), and the display unit.

While various embodiments have been described above with reference to the drawings, the present invention is not limited to such examples. It is apparent that those skilled in the art may perceive various modification examples or correction examples within the scope disclosed in the claims, and those examples are understood as falling within the technical scope of the present invention. In addition, any combination of the constituents in the embodiment may be formed without departing from the gist of the invention.

The present application is based on Japanese Patent Application (JP2018-029057) filed on Feb. 21, 2018, the content of which is incorporated in the present application by reference.

According to the present invention, an optical unit enabling reduction of design cost and size reduction and a projection apparatus comprising the optical unit can be provided.

EXPLANATION OF REFERENCES 100, 100A to 100F: projector
1: display unit
40: light source unit
41r: R light source
41g: G light source
41b: B light source
42r, 42g, 42b: collimator lens
43: dichroic prism
44: light modulation element
2, 2A: projection optical system
2a: projection lens group
2b: stop
3: common optical system
31, 33, 34: lens group
32: optical member
IG: position
SC: screen
4, 4A: optical member
4a: functional surface
5, 5A, 5B: imaging optical system
5a, 5c: lens group
5b: optical member
6: imaging element

What is claimed is:

1. An optical unit which is attachable to and detachable from a projection apparatus main body including a display unit, the optical unit comprising:
 a projection optical system on which light from a display unit is incident;
 a common optical system that projects light passing through the projection optical system to a projection target object and forms an image of a subject at a side of the projection target object;
 an optical member that is positioned between the projection optical system and the common optical system, guides light passing through the projection optical system to the common optical system and guides an intermediate image formed by at least a part of the common optical system to an imaging element; and
 an imaging optical system for forming the intermediate image on the imaging element,
 wherein an image forming position of the intermediate image is present between a component closest to a side of the projection target object among components constituting the common optical system and the optical member, and
 the imaging element is attachable to and detachable from the optical unit.

2. The optical unit according to claim 1,
 wherein the image forming position is present between the optical member and the common optical system.

3. The optical unit according to claim 1,
 wherein an imaging magnification of the imaging optical system for the intermediate image incident on the optical member is greater than or equal to 0.1 and less than 1.0 times a projection magnification of the projection optical system for an image displayed by the display unit.

4. The optical unit according to claim 2,
 wherein an imaging magnification of the imaging optical system for the intermediate image incident on the optical member is greater than or equal to 0.1 and less than 1.0 times a projection magnification of the projection optical system for an image displayed by the display unit.

5. The optical unit according to claim 1,
 wherein the common optical system includes a bending optical member for bending an optical path.

6. The optical unit according to claim 2,
 wherein the common optical system includes a bending optical member for bending an optical path.

7. The optical unit according to claim 1,
 wherein the imaging optical system includes a bending optical member for bending an optical path.

8. The optical unit according to claim 2,
 wherein the imaging optical system includes a bending optical member for bending an optical path.

9. The optical unit according to claim 1,
 wherein the imaging optical system includes a movable component for changing an imaging condition.

10. The optical unit according to claim 2,
 wherein the imaging optical system includes a movable component for changing an imaging condition.

11. The optical unit according to claim 9,
 wherein the movable component is at least one of a movable stop, a focus lens, or a zoom lens.

12. The optical unit according to claim 10,
 wherein the movable component is at least one of a movable stop, a focus lens, or a zoom lens.

13. The optical unit according to claim 1,
 wherein the projection optical system includes at least one lens and a stop arranged between the lens and the optical member, and
 the stop is fixed to the optical member.

14. The optical unit according to claim 2,
 wherein the projection optical system includes at least one lens and a stop arranged between the lens and the optical member, and
 the stop is fixed to the optical member.

15. The optical unit according to claim 1, further comprising:
 the imaging element.

16. The optical unit according to claim 2, further comprising:
 the imaging element.

17. A projection apparatus comprising:
 the optical unit according to claim 1; and
 the projection apparatus main body.

* * * * *